S. WHITING.
SPRING FRONT FORK FOR MOTOR CYCLES AND LIKE MACHINES.
APPLICATION FILED MAR. 30, 1915.
1,155,458.
Patented Oct. 5, 1915.
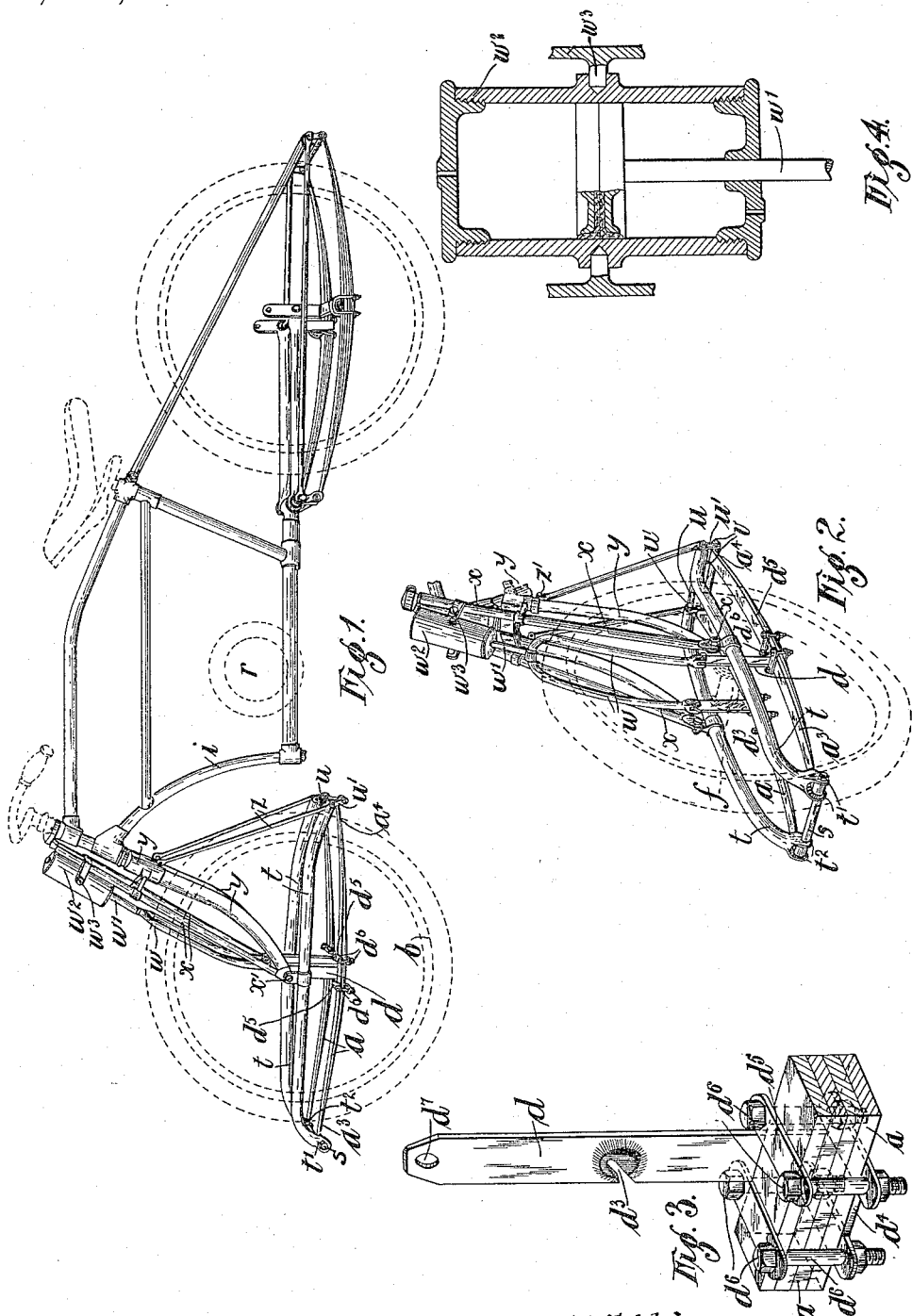
S. Whiting, Inventor
by G. Croydon Marks
Attorney

UNITED STATES PATENT OFFICE.

SAVILLE WHITING, OF ST. KILDA, VICTORIA, AUSTRALIA.

SPRING FRONT FORK FOR MOTOR-CYCLES AND LIKE MACHINES.

1,155,458. Specification of Letters Patent. Patented Oct. 5, 1915.

Original application filed July 29, 1914, Serial No. 853,884. Divided and this application filed March 30, 1915. Serial No. 18,180.

*To all whom it may concern:*

Be it known that I, SAVILLE WHITING, a subject of the King of Great Britain and Ireland, and residing at Glencoe, Canterbury Road, St. Kilda, in the State of Victoria, Commonwealth of Australia, have invented a certain new and useful Improved Spring Front Fork for Motor-Cycles and like Machines, of which the following is a specification.

This invention relates to spring mounting for the front wheels of motor cycles and like machines of the type employing semi-elliptic laminated leaf springs carrying approximately at their centers slotted plates to receive the wheel axle, the slotted plates being connected to the ends of a fork the other ends of which are formed as a shank sliding in a guide.

The object of the present invention is to improve a spring suspension of the kind above referred to, and it consists in fitting the shank on the fork carrying the slotted plates which receive the axle with a piston adapted to slide within a cylinder attached to the main steering column and containing suitable compression means, and forming a cushion adapted to absorb shocks to the front wheel, as well as a guide for steadying the front wheel.

The invention will now be described with reference to the accompanying drawings in which:

Figure 1 is a side view of a motor cycle embodying the invention; Fig. 2 is a perspective view of the front wheel suspension, and Fig. 3 is an enlarged perspective view of a detail hereinafter referred to. Fig. 4 is an enlarged sectional view of the cylinder hereinafter referred to.

In carrying the invention into effect, the front ends $a^3$ of the laminated leaf springs $a$ encircle a cross rod $s$ which passes through the two bifurcated ends $t'$ and $t^2$ of two cambered girders $t$ while at the opposite end of said girders $t$ a cross pin $u$ is provided (see Fig. 2) and from which depend links $u'$ through the lower ends of which a cross pin $v$ passes, the said pin $v$ receiving the ends $a^4$ of the springs $a$ and allowing them a rocking movement when they are deflected during the working of the machine. The hanging rectangular slotted plates $d$ in this front wheel construction are slotted at $d^3$ (see Fig. 3), and have a rectangular foot $d^4$ underneath the spring $a$ thus forming a clamp with the top plates $d^5$ and bolts $d^6$ to hold or support the spring $a$.

The slots $d^3$ in manner hereinbefore mentioned permit the axle to be removed in the ordinary way from its environment for retiring and other purposes. At the top of each of the two slotted plates $d$ of the front wheel is a perforation $d^7$ through which a pin $d^8$ passes to form a joint at each side respectively with the outwardly bent bifurcated ends of a fork $w$ the shank $w'$ of which (see Figs. 2 and 4) headed with a piston, operates in the cylinder $w^2$, the action being preferably pneumatic to form a cushion, or any approved spring cushion may be employed therein.

The cylinder is pivoted at $w^3$ to two standards $x$ the latter being secured to the top of the main steering fork $y$ and to the bottom thereof by a pin at $x'$ which also serves to connect the bottom of the said main steering fork $y$ to the middle of the cambered girders $t$.

$z$ are two diagonal stay rods secured to the upper portion of the main fork at $z'$ and the pin $u$ below, thus adding an increased strength or prop to the main steering fork.

It is to be understood that the front wheel suspension above described, which allows a solid tire to be used suitable to military and other purposes, may be used on any form of motor cycle, but if preferred it may be used on a motor cycle the back wheel of which has a spring suspension according to my co-pending British application No. 17140 of 1914.

Having now described my invention what I claim as new and desire to secure by Letters Patent is:—

1. A spring fork for the front wheel of a motor cycle or like machine, comprising in combination, a front wheel fork, a main steering column, a pair of laminated springs, bearing members clamped on the springs to receive the wheel axle, a guide fork with its open ends secured to the said bearing members, a shank at the other end of the guide fork, a cylinder carried by the steering column, a piston on the shank adapted to slide in the cylinder, and compression means in the latter.

2. A spring fork for the front wheel of a motor cycle or like machine, comprising in combination, a front wheel fork, a main steering column, a pair of cambered girders carried by the said front fork, a pair of laminated springs secured by their respective opposite ends to the respective ends of the cambered girders, bearing members clamped on the springs to receive the wheel axle, a guide fork with its open ends secured to the said bearing members, a shank at the other end of the guide fork, a cylinder carried by the steering column, a piston on the shank adapted to slide in the cylinder, and compression means in the latter.

3. A spring fork for the front wheel of a motor cycle or like machine, comprising in combination, a front wheel fork, a main steering column, a pair of cambered girders, carried by the said front fork, a pair of standards secured to the respective ends of the fork and to the top of the steering column, diagonal stay rods secured to the upper portion of the wheel fork, and to the ends of the cambered girders, bearing members clamped on the springs to receive the wheel axle, a guide fork with its open ends secured to the said bearing members, a shank at the other end of the guide fork, a trunnion mounted cylinder carried by the steering column, a piston on the shank adapted to slide in the cylinder, and compression means in the latter.

In testimony whereof I have signed my name to this specification in the presence of two subscribing witnesses.

SAVILLE WHITING.

Witnesses:
  JOHN MORGAN,
  FRANCIS MALPAS.

Copies of this patent may be obtained for five cents each, by addressing the "Commissioner of Patents, Washington, D. C."